United States Patent
Kiel

(10) Patent No.: US 8,031,969 B1
(45) Date of Patent: Oct. 4, 2011

(54) FOURIER TRANSFORM OPTIMIZED ANISOTROPIC FILTERING

(75) Inventor: Jeffrey T. Kiel, Raleigh, NC (US)

(73) Assignee: NVIDIA Corporation, Santa Clara, CA (US)

( * ) Notice: Subject to any disclaimer, the term of this patent is extended or adjusted under 35 U.S.C. 154(b) by 1122 days.

(21) Appl. No.: 10/936,150

(22) Filed: Sep. 7, 2004

(51) Int. Cl.
G06K 9/44 (2006.01)
G06K 9/46 (2006.01)
G06K 9/54 (2006.01)

(52) U.S. Cl. ........ 382/276; 348/270; 348/273; 348/342; 348/835; 382/154; 382/280

(58) Field of Classification Search .................. None
See application file for complete search history.

(56) References Cited

U.S. PATENT DOCUMENTS

| | | | | |
|---|---|---|---|---|
| 3,729,252 | A * | 4/1973 | Nelson | 359/562 |
| 5,959,776 | A * | 9/1999 | Pasch | 359/562 |
| 6,094,499 | A * | 7/2000 | Nakajima et al. | 382/124 |
| 6,353,689 | B1 * | 3/2002 | Kanamaru et al. | 382/280 |
| 6,527,720 | B1 * | 3/2003 | Ustuner et al. | 600/443 |
| 6,584,234 | B2 * | 6/2003 | Kanamaru et al. | 382/280 |
| 6,816,166 | B2 * | 11/2004 | Shimizu et al. | 345/581 |
| 7,146,059 | B1 * | 12/2006 | Durand et al. | 382/260 |
| 2001/0020950 | A1 * | 9/2001 | Shimizu et al. | 345/611 |
| 2004/0207881 | A1 * | 10/2004 | Nomura | 358/3.24 |
| 2005/0031201 | A1 * | 2/2005 | Goh | 382/169 |
| 2005/0123092 | A1 * | 6/2005 | Mistretta et al. | 378/23 |

OTHER PUBLICATIONS

ATI, "RADEON 9700 Series: User's Guide," ATI, pp. 1-32.*
Goksel et al., "An FFT Implementation of the generalized maximum algorithm for image smoothing," Aug. 6, 2002, IEEE, pp. 1139-1141.*
Bajaj et al., "Anisotropic diffusion of surfaces and functions on surfaces," Jan. 2003, ACM, vol. 22, pp. 1-30.*

* cited by examiner

*Primary Examiner* — John Lee
(74) *Attorney, Agent, or Firm* — Patterson & Sheridan, LLP

(57) ABSTRACT

Methods and apparatuses for selecting appropriate anisotropic filtering levels for images. An image is obtained, that image is Fourier transformed into its frequency components, and then those frequency components are normalized. The Fourier transformed into its frequency components are assigned to Fourier buckets (or bins) having dimensions selected in accord with the number of available anisotropic filtering levels. A predetermined threshold value is used to select one of the Fourier buckets by comparing the predetermined threshold value with the contents of the Fourier buckets. The selected Fourier bucket is used to determine an appropriate anisotropic filtering level for the image. Some embodiments of the present invention can provide for an automatic selection and setting of the appropriate anisotropic filtering level.

16 Claims, 4 Drawing Sheets

FOURIER TRANSFORM OPTIMIZED ANISOTROPIC FILTERING

FIELD OF THE INVENTION

This invention relates to graphic systems. More particularly, this invention relates to optimizing anisotropic filtering levels using Fourier transform analysis.

BACKGROUND OF THE INVENTION

Graphics processing is an important feature of modern high-performance computing systems. In graphic processing, mathematical procedures are implemented to render, or draw, graphic primitives, e.g., triangles or rectangles, on a display to produce desired visual images. Real time graphics processing is based on the high-speed processing of graphic primitives to produce visually pleasing moving images.

Early graphic systems were limited to displaying image objects comprised of graphic primitives having smooth surfaces. That is, visual textures, bumps, scratches, or other surface features were not modeled in the graphics primitives. To enhance image quality, texture mapping of real world attributes was introduced. In general, texture mapping is the mapping of an image onto a graphic primitive's surface to create the appearance of a complex image without the high computational costs associated with rendering actual three dimensional details of an object.

Graphics are typically produced by graphics designers who use application program interfaces (API's), which are standardized software interfaces, to render desired images that can be run on multiple platforms, operating systems; and hardware. Examples of API's include the Open Graphics Library (OpenGL®) and D3D™. This enables graphic designers to design graphics without knowing any of the specifics regarding the system hardware or how their commands will be implemented.

FIG. 1 illustrates a simplified block diagram of a graphics system 100 that includes a graphics processing unit 102. As shown, that graphics processing unit 102 has a host interface/front end 104. The host interface/front end 104 receives raw graphics data from a central processing unit 103 that is running an application program stored in memory 105. That application program can be input from a computer readable medium 105A. The host interface/front end 104 buffers input information and supplies raw graphic information to a geometry engine 106. The geometry engine has access to a frame buffer memory 120 via a frame buffer interface 116. The geometry engine 106 produces, scales, rotates, and projects three-dimensional vertices of graphics primitives in "model" coordinates that are stored in the frame buffer memory 120 into two-dimensional frame-buffer co-ordinates. Typically, triangles are used as graphics primitives for three-dimensional objects, but rectangles are often used for 2-dimensional objects (such as text displays).

The two-dimensional frame-buffer co-ordinates of the vertices of the graphics primitives from the geometry engine 106 are applied to a rasterizer 108. The rasterizer 108 identifies the positions of all of the pixels within the graphics primitives. This is typically performed along raster (horizontal) lines that extend between the lines that define the graphics primitives. The output of the rasterizer 108 is referred to as rasterized pixel data.

The rasterized pixel data are applied to a shader 110 that processes input data (code, position, texture, conditions, constants, etc) using a shader program (sequence of instructions) to generate output data. Shaders can be considered as a collection of processing capabilities that can handle large amounts of data at the same time, such as by parallel processing data.

The shader 110 includes a texture engine 112 that modifies the rasterized pixel data to have the desired texture and optical features. The texture engine 112, which has access to the data stored in the frame buffer memory 120, can be implemented using a hardware pipeline that processes large amounts of data at very high speed. The shaded pixel data is then sent to a Raster Operations Processor 114 (Raster op in FIG. 1) that optionally performs additional processing on the shaded pixel data. The result is pixel data that is stored in the frame buffer memory 120 by the frame buffer interface 116. The frame pixel data can be used for various processes such as being displayed on a display 122.

The foregoing overview of graphics systems has presented a simplified view of graphics. In practice, a graphics designer often works with texture bitmaps that are tiled to produce a graphic design. For example, a brick wall can be formed by taking a simple texture bitmap, say a several brick separated by mortar, and then tiling that texture bitmap to form a wall. While the foregoing is accurate as far as it goes, it too is also somewhat simplified. While a good image of a wall from a "head-on" view can be formed by tiling the same texture bitmap over and over, when the view changes to an angle or to perspective, the texture bitmap should be changed. After all, a brick that is perceptively far away is smaller, and thus takes fewer pixels to show, than a close brick. However, simply eliminating pixels can cause visual problems. However, changes to a texture bitmap can be implemented using mipmaps, i.e., texture bitmaps having size variations.

FIG. 2 illustrates how a simple image can become complicated by a simple change in perspective. A graphical image 200 represents a more or less "head-on" view of a tiled structure comprised of blocks formed by lines 202-210. When a viewer's viewpoint changes to an upward angle the lengths of the lines 204-210 change as shown in FIG. 201. If each block is a textured bitmap the visually far away textures require fewer pixels and those pixels form a more elongated shape. In general, the process of determining which texels map to screen pixels is called "texture sampling and filtering."

To ensure a realistic appearance the texture tiles close to a viewer's perspective must look very detailed while those farther away become less detailed. While some detail loss is inevitable, good texture filtering minimizes and controls detail loss while providing a natural look. For example, a word on a wall far away should not simply disappear because its lines are formed by eliminated pixels. Without texture filtering an image can become highly pixilated (splotches caused by lost pixels). To avoid pixilation effects many graphic forming and editing programs allow a graphics designer to implement various types of filtering. For example, a simple point sampling routine samples the nearest texel, a bilinear filter samples a 2×2 area of the texture and then averages, and a trilinear filter samples a 2×2 on one mip level, a 2×2 on the next mip level, and interpolates between the two values.

While the foregoing filtering techniques improve graphics quality, the best filtering method is often anisotropic filtering. In anisotropic filtering pixels are not derived from a symmetrical shape. Rather, pixels are formed by increasing the samples along the "long edge" of the figure and then interpolates as in trilinear filtering. The number of pixels used for filtering determines the filter level. 1× anisotropic filtering uses 8 pixels, 2× anisotropic filtering uses 16 pixels, 3× anisotropic filtering uses 24 pixels, and so on. Some graphics cards can achieve 16× anisotropic filtering (128 pixels). However, the higher the anisotropic filtering level the more computation time is required to implement the filter. Furthermore, with some images the visual difference between say 4× and 16× anisotropic filtering is difficult or impossible to detect, in other images the visual difference can be dramatic. Thus, sometimes 4× anisotropic filtering is highly beneficial because it produces high quality results relatively quickly while at other times 4× level anisotropic filtering is insufficient from an artistic viewpoint.

It is possible to implement graphics design packages that would allow a graphics designer to specify numerous editing and formatting attributes, including the type of filtering that is to be used. Such design packages would enable a designer to specify the level of filtering. Since high levels of anisotropic filtering does not harm graphical views it might seem that a designer would simply choose the highest possible level of anisotropic filtering. Unfortunately, many design projects are subject to a computational budget. For example, a game designer might be given a computational budget that permits the game being designed to run with a specified performance at a specified frame rate at a specified resolution and on a specified graphics system. If that budget is exceeded performance may be compromised. To meet the computational budget a graphics designer may have to limit or even eliminate some of the numerous editing and formatting attributes at his disposal. Since high levels of anisotropic filtering require extensive computational time, an anisotropic filtering level that is too high can seriously reduce the computational budget available for other tasks. Thus a designer should often select a relatively minimal anisotropic filtering level to ensure that adequate computation resources are available to meet other requirements.

In the prior art a graphics designer had little but his experience and trial and error to assist him when selecting an appropriate anisotropic filtering level. In practice, a designer could select an anisotropic filtering level and then note the impact of that level on his computational budget.

In view of the foregoing, a method of determining an appropriate anisotropic filtering level for a given image would be beneficial. Even more beneficial would be an automatic method of determining an appropriate anisotropic filtering level. Also beneficial would be a system and a method for reducing the impact of anisotropic filtering levels on computational budgets by enabling selection of an appropriate anisotropic filtering level for a given situation. A method of selecting an appropriate anisotropic filtering level and then automatically setting that level also would be beneficial.

BRIEF SUMMARY OF THE INVENTION

The principles of the present invention provide for new, useful, and non-obvious methods and apparatuses for selecting appropriate anisotropic filtering levels. Embodiments of those methods and apparatuses can enable determining an appropriate anisotropic filtering level for a given image, beneficially on an image by image basis. Some embodiments of the present invention can provide an automatic method of determining an appropriate anisotropic filtering level for a given image. Some embodiments of the present invention can provide for an automatic selection and setting of an appropriate anisotropic filtering level for a given situation.

BRIEF DESCRIPTION OF THE DRAWINGS

The foregoing and other aspects and advantages are better understood from the following detailed description of a preferred embodiment of the invention with reference to the drawings, in which.

DESCRIPTION OF THE PREFERRED EMBODIMENTS

The principles of the present invention provide for a new, useful, and non-obvious method and apparatus for selecting and setting appropriate anisotropic filtering level for an image being filtered. That image, which can be in any of a wide variety of formats, is first Fourier transformed. This results in the high frequency components being near the center of the transformed image and the DC components being at the corners. The Fourier transformed results are then normalized so as to remap the transform results such that the DC components are at the center and the high frequency components are near the corners. The normalized Fourier transformed image is then analyzed by finding which frequency component of the image is within determined threshold areas. To do so, the normalized Fourier transformed image components are grouped into multiple, non-overlapping Fourier transformed frequency space areas that are referred to herein as Fourier buckets. For example, if ten Fourier transformed frequency space areas are used the normalized Fourier transformed image space is grouped into N/10 non-overlapping Fourier buckets. Then, the Fourier buckets are analyzed to determine which Fourier bucket contains a predetermined threshold frequency component. If the predetermined threshold frequency component is 0.70, and if the $3^{rd}$ Fourier bucket holds that component, the analysis returns 3. That value is then used to set the appropriate anisotropic filtering level. Such setting can be done automatically. For example, by appending an appropriate anisotropic filtering level to the image. Then, when that image is read the appended anisotropic filtering level can be read and input to a program to set the anisotropic filtering level. Alternatively, a software package can input the image and then compute and set the anisotropic filtering level.

Figure 3:
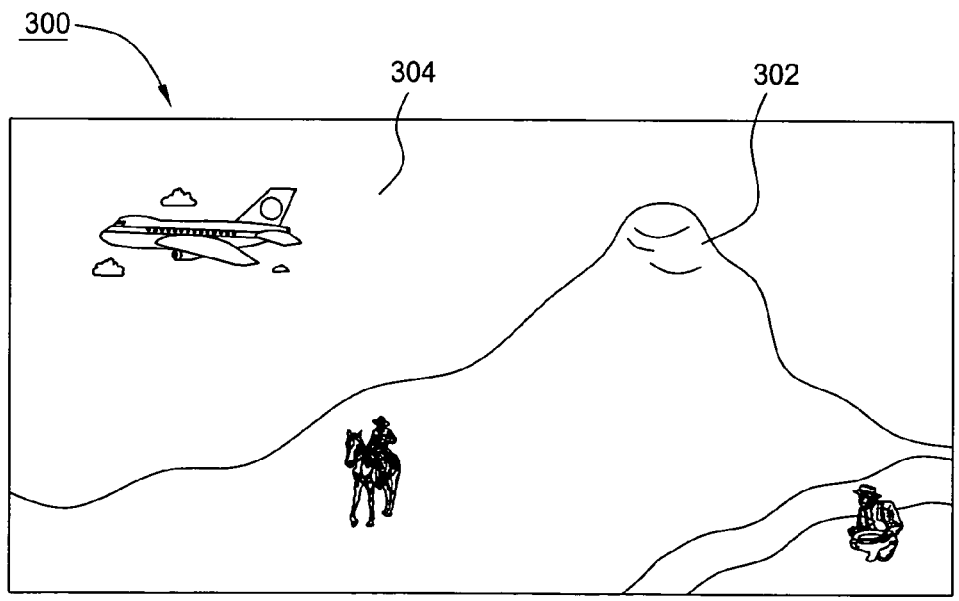
FIG. 3 illustrates a JPEG image.

To better understand the principles of the present invention it may be helpful to refer to FIG. 3, which shows an exemplary image 300 that is to be processed in accord with the principles of the present invention. For purposes of explanation but not limitation, the image 300 is a JPEG image that includes tiled, textured bitmaps that form a mountain 302 and a background sky 304.

Figure 4:
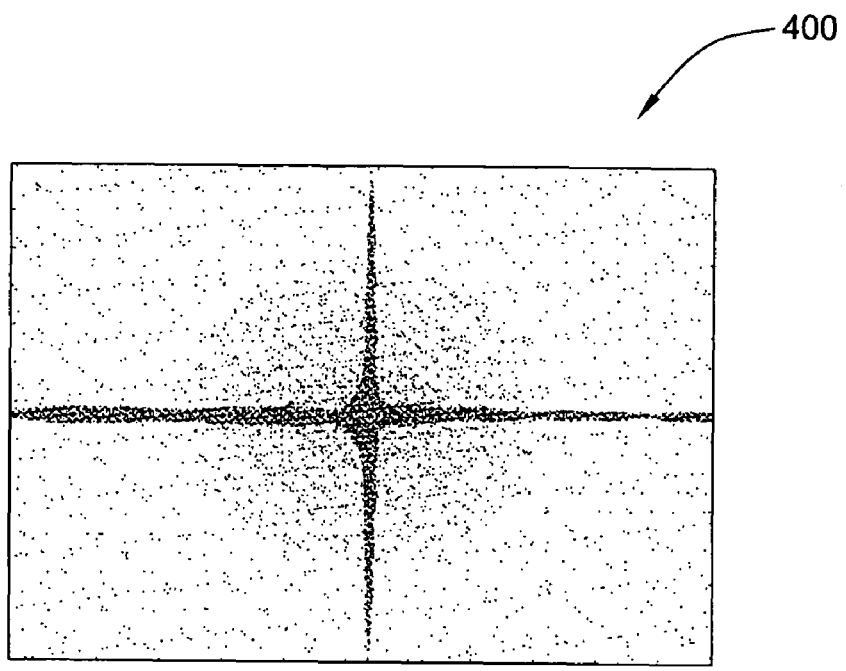
FIG. 4 conceptually illustrates a normalized FFT version of the image of FIG. 3.
Figure 5:
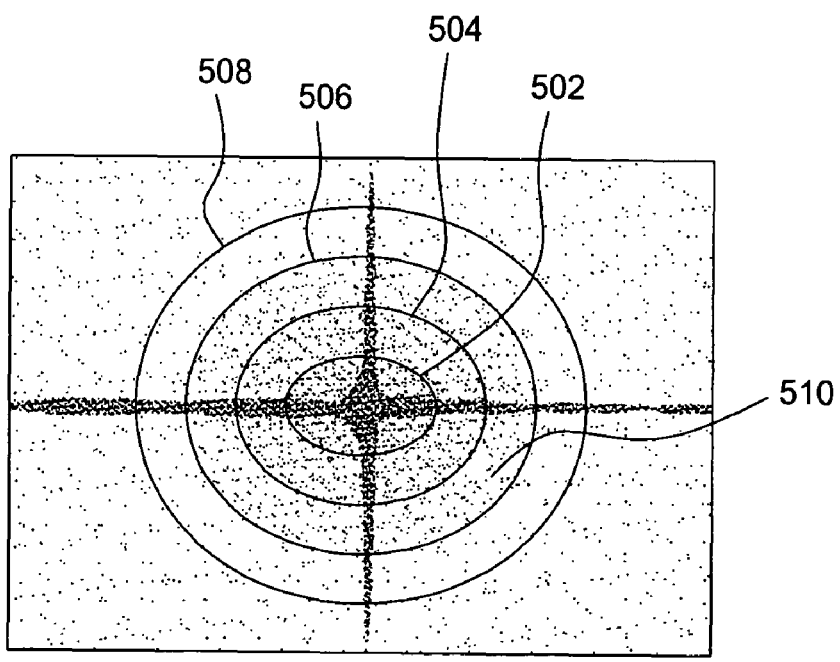
FIG. 5 conceptually illustrates the normalized FFT components of FIG. 4 mapped into Fourier buckets.

As is well known in the art, images can be transformed into a frequency space representation, beneficially using a fast Fourier transform. FIG. 4 is a conceptual illustration of a normalized, fast Fourier transform mapping of the image 300. Normalization produces a Fourier transform mapping such that the Fourier components range between DC at the center while the high frequency components are away from the center.

According to the principles of the present invention the normalized Fourier transformed components of the image 300 are placed in concentric areas, the Fourier buckets. The center of the image represents DC component (areas of the image 300 having a constant value) and the Fourier transformed components close to the center represent slowing changing areas of the image 300. The center bucket is defined by conceptual lines 502. Outside of the conceptual line 502 is another area defined by the area between lines 504 and 502. This represents the second Fourier bucket, and it contains relatively low frequency Fourier transformed components, areas of the image that do not change very quickly, but more so that the Fourier transformed components within the first Fourier bucket. Outside of line 504 is a line 506 which defines a Fourier bucket between lines 506 and 504. This general process continues until the only Fourier transformed components that are not contained within a conceptual line are beyond a line 508. Those Fourier transformed components represents the highest frequency components of the image 300, that is, the areas of image 300 that change the fastest. Those Fourier transformed components are placed in the last Fourier bucket. Every image component in the normalized fast Fourier transformed version is placed within one of the Fourier buckets.

According to the principles of the present invention, there is some predetermined normalized Fourier value that acts as a Fourier bucket identifier. For example, say 0.7 is the predetermined normalized value. The 0.7 relates to 70% of the magnitude of the Fourier component values. There is going to be a fast Fourier transformed image point which is closest to, but does not exceed, the $70^{th}$ magnitude percentile starting from the center of the normalized FFT data set. That image point, for example image point 510, is located within one of the Fourier buckets, in this case within the third Fourier bucket. That third bucket is used to set the anisotropic filter level.

The principles of the present invention are based on recognition that in a normalized Frequency domain a beneficial anisotropic filter level can become apparent. This is because an image that transforms with many low frequency values (a slowly changing image) requires a relatively low anisotropic filter level while one with many high frequency components (a fast changing image) requires a high anisotropic filtering level. This generally corresponds to that fact that removal of relatively high frequency components tend to slightly blur an image while removal of low frequency component tends to sharpen an image.

Figure 6:
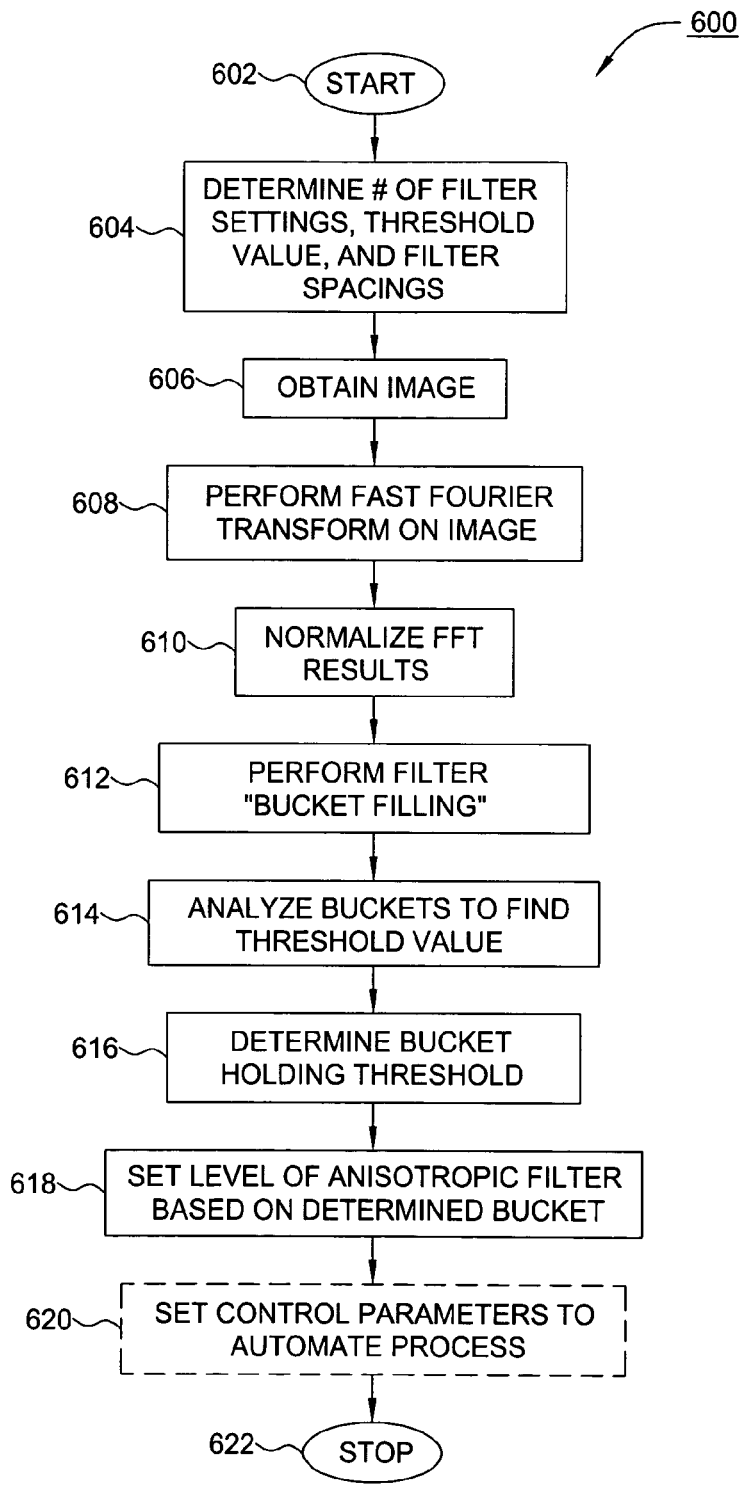
FIG. 6 illustrates a method determining an anisotropic filter level that is in accord with the principles of the present invention.

A method 600 of selecting an appropriate anisotropic filtering level is illustrated in FIG. 6. The method 600 starts at step 602 and proceeds at step 604 where the number of available anisotropic filter settings is determined, a threshold value is set, and the spacing of the Fourier buckets are determined (see below). In some programs the number of anisotropic filtering settings might range from 2× to 32×, in others there might be 2× to 8×. If the optimal anisotropic filter level is determined to be higher than the maximum level that is available the method should default to using the highest available level. The threshold value adjusts which higher frequency components are to be retained when setting the anisotropic filtering level. If a low threshold value is used very little of the high frequency components are considered and a low value of anisotropic filtering will result. A typical value might be 0.7 which then represents 70 percentile of the fast Fourier transformed components.

After step 604, the method 600 proceeds to step 606 where an image is obtained. As previously noted, that image can be in any number of formats but the JPEG format (FIG. 3) is a widely used format. After step 606, at step 608, a fast Fourier transform is performed on the image obtained in step 606. A fast Fourier transformed image produces a range of frequency components that span from DC (at the corners) to a high frequency component N (which depends on the image) near the center. Then at step 610, the Fourier transformed image data is normalized. That is, the Fourier transform image components are remapped to map the highest fast Fourier transform image components, N, toward an edge and the DC components to the center. Then at step 612, the normalized fast Fourier image components are fit into Fourier buckets. The number of Fourier buckets corresponds to the filter spacing selected in 604 and on the number of available filter settings.

At step 614, the contents of the Fourier buckets are analyzed to find the image component that is closest to, but does not exceed, the threshold value set at step 604. At step 618, the Fourier transform bucket that holds that threshold value is used to determine the optimal anisotropic filtering level. If the optimal anisotropic filtering level is available, that optimal level is used. If the optimal anisotropic filtering level is not available the highest level that is available is used.

Determining the anisotropic filtering level may require a mapping between the available Fourier buckets and the number of available filter settings. The number of Fourier buckets doesn't have to be linked to the number of available levels. For example, one card might have a maximum 8× anisotropic level while another card might support 16× (the 8× setting on both cards are the same) Then, optional step 620 can be performed in which the control parameters for the image obtained at step 606 is automatically set to run at the anisotropic filtering level set at step 618. An image can be modified to include a control parameter that can be read by software and used to automatically set various component values, including the anisotropic filtering level. Thus, once a proper anisotropic filtering level is determined, subsequent operations using the obtained image at step 606 can be run with the appropriate anisotropic filter level without re-running the Fourier transform steps. Then at step 622, the method 600 stops.

At the present time, the optimal filter spacing, which sets the size of the Fourier buckets, is not known. Evenly spaced Fourier buckets have been used successfully, but this is neither required nor is it necessarily optimal. Ongoing investigations are being carried out to determine whether a linear spacing, exponential spacing, Gaussian spacing, or some other spacing is better. Indeed, no one spacing may be optimal for all applications (or images). Experimentation may be required to optimize the spacing.

Additionally, an optimal threshold point is also not known at this time. The optimal threshold may be a function of the filter spacing (Fourier bucket sizes), the image, or some other factor. However, a value of 0.7 represents an appropriate starting point.

There are numerous graphic composition programs that are available, for example the FX Composer available from the assignee of the present invention. Many of those graphics composition software packages can be run via command line settings. Such graphic composition software programs often have to balance the performance levels obtained versus the class of device that will be running the software program. For example, a high-end computer with a high resolution graphics processor and display versus a low end computer with a low end computer graphics card and possibly even without a graphics processing system. Those concerns are typically input to the graphics composer as computational limitations.

Figure 1:
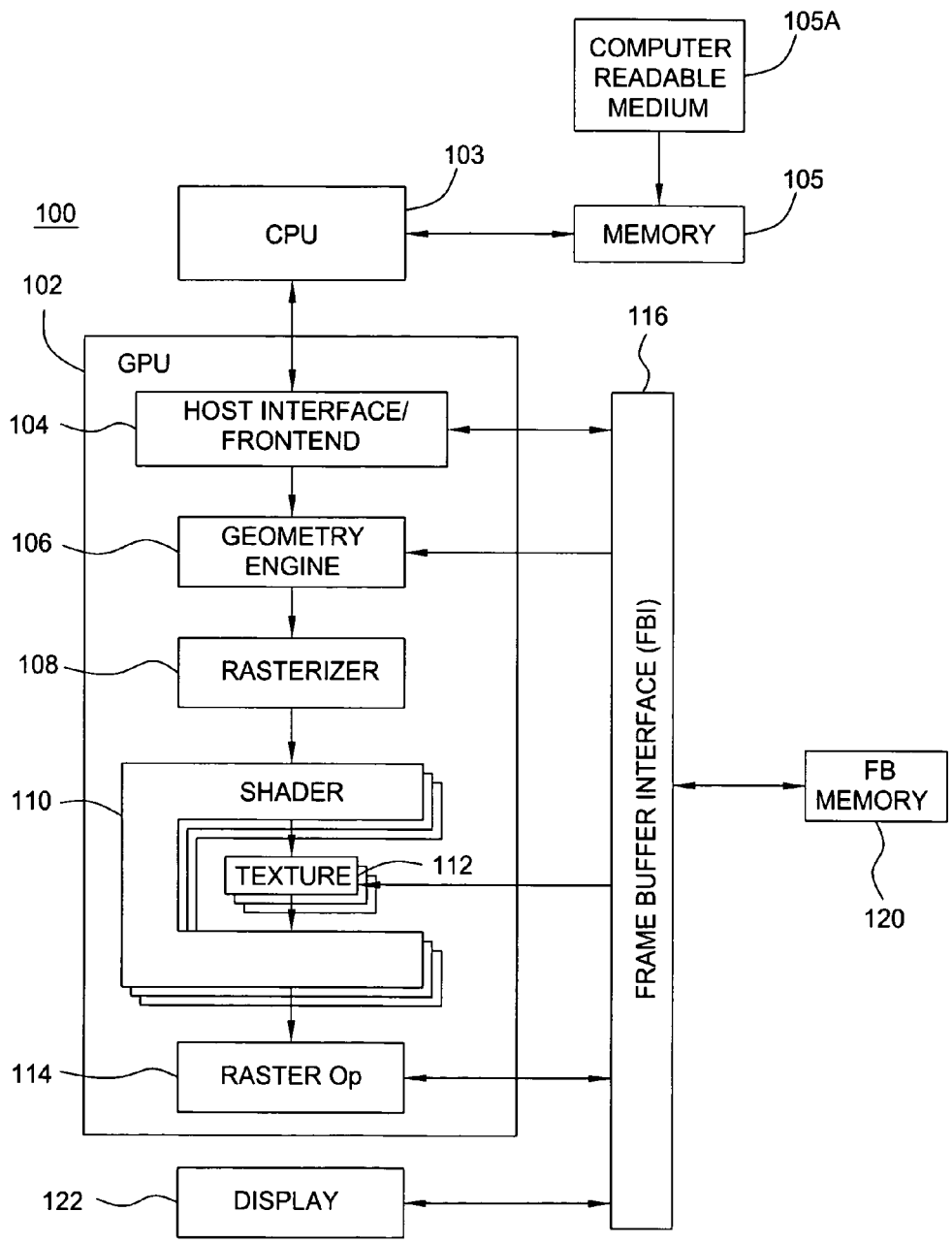
FIG. 1 schematically illustrates a prior art graphics system.
Figure 2:
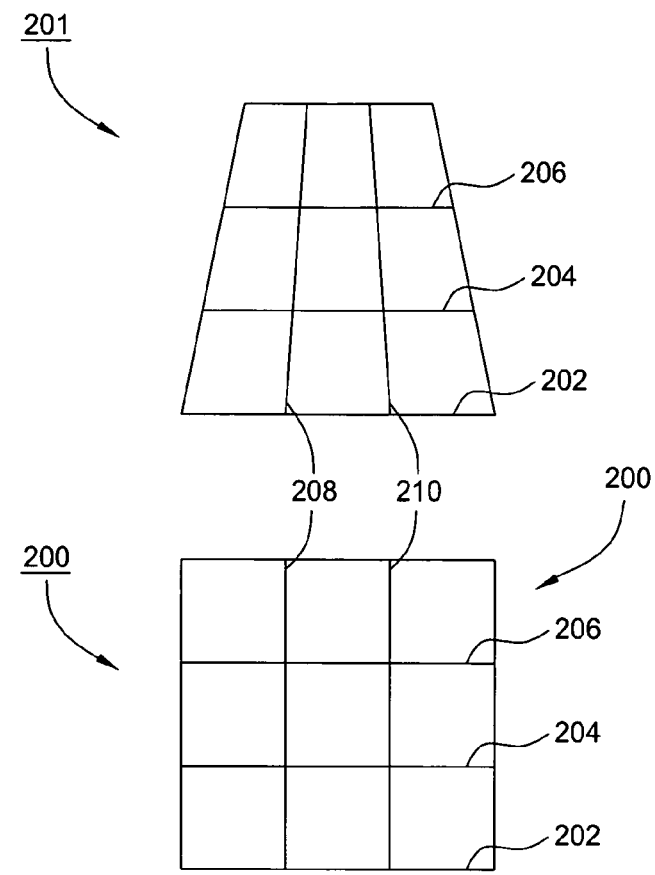
FIG. 2 illustrates two view of a simple figure.

One method of implementing the principles of the present invention is to include software commands that can be run on a software readable medium which can cause one of the graphics programs from operating in accord with the method 600. For example, a DLL (Dynamic Link Library) can be added to callable software of one or more of the graphic composers. Alternatively, a Java Applet can be added to a graphics composer to implement the principles of the present invention. In any event, the principles of the present invention can be implemented on a computable readable medium. Thus, the computable readable medium 105A illustrated in FIG. 1 is suitable for practicing the principles of the present invention.

While various embodiments have been described above, it should be understood that they have been presented by way of example only, and not limitation. Thus, the breadth and scope of a preferred embodiment should not be limited by any of the above described exemplary embodiments, but should be defined in accordance with the following claims and their equivalents.

What is claimed is:

1. A computer implemented method for selecting an anisotropic filter level, comprising steps of:
    determining a set of available anisotropic filter levels and a threshold value;
    obtaining an image;
    performing a Fourier transform on the image to produce Fourier transformed image components, wherein the Fourier transformed image components include low frequency components situated near the corners of the image and high frequency components situated near the center of the image;
    normalizing the Fourier transformed image components by remapping the high frequency components toward an edge of the image and low frequency components toward the center of the image;
    defining a set of Fourier buckets, wherein each Fourier bucket corresponds to a different range of frequencies and includes one or more Fourier transformed image components from the normalized Fourier transformed image components, the frequency associated with each of the one or more Fourier transformed image components falling within the range of frequencies corresponding to the Fourier bucket;
    identifying a first Fourier bucket in the set of Fourier buckets that includes a first Fourier transformed image component that is closest to but does not exceed the threshold value;
    selecting the anisotropic filter level based on the identified first Fourier bucket that includes the first Fourier transformed image component and a mapping between the set of Fourier buckets and the set of available anisotropic filter levels; and
    appending the anisotropic filter level to the image so that, when the image is read, the anisotropic filer level is read.

2. The method according to claim 1, wherein the Fourier transform is a fast Fourier transform.

3. The method according to claim 1, wherein sizes of the range of frequencies corresponding to the Fourier bucket in the set of Fourier buckets are equal.

4. The method according to claim 1, wherein sizes of the range of frequencies corresponding to the Fourier bucket in the set of Fourier buckets are exponentially related.

5. The method according to claim 1, further including a step of modifying the image to include a software readable control parameter that sets the anisotropic filter level.

6. A non-transitory computer readable medium including software instructions that control a processor to automatically select an anisotropic filter level, by performing the steps of:
    determining a set of available anisotropic filter levels and a threshold value;
    obtaining an image;
    performing a Fourier transform on the image to produce Fourier transformed image components, wherein the Fourier transformed image components include low frequency components situated near the corners of the image and high frequency components situated near the center of the image;
    normalizing the Fourier transformed image components by remapping the high frequency components toward an edge of the image and low frequency components toward the center of the image;
    defining a set of Fourier buckets, wherein each Fourier bucket corresponds to a different range of frequencies and includes one or more Fourier transformed image components from the normalized Fourier transformed image components, the frequency associated with each of the one or more Fourier transformed image components falling within the range of frequencies corresponding to the Fourier bucket;
    identifying a first Fourier bucket in the set of Fourier buckets that includes a first Fourier transformed image component that is closest to but does not exceed the threshold value;
    selecting the anisotropic filter level based on the identified first Fourier bucket that includes the first Fourier transformed image component and a mapping between the set of Fourier buckets and the set of available anisotropic filter levels; and
    appending the anisotropic filter level to the image so that, when the image is read, the anisotropic filer level is read.

7. The computer readable medium according to claim 6, wherein the Fourier transform is a fast Fourier transform.

8. The computer readable medium according to claim 6, wherein sizes of the range of frequencies corresponding to the Fourier bucket in the set of Fourier buckets are equal.

9. The computer readable medium according to claim 6, wherein sizes of the range of frequencies corresponding to the Fourier bucket in the set of Fourier buckets are exponentially related.

10. The computer readable medium according to claim 6, further including software instructions that cause the processor to modify the image to include a software readable control parameter that sets the anisotropic filter level.

11. The computer readable medium according to claim 6, wherein the software instructions are part of a dynamic link library.

12. The computer readable medium according to claim 6, wherein the software instructions are part of a Java applet.

13. A computer system comprising:
    a central processing unit for running a program that processes an image to determine an anisotropic filter level for that image, the program causing the computer system to perform steps of:
    determining a set of available anisotropic filter levels and a threshold value;
    obtaining an image;
    performing a Fourier transform on the image to produce Fourier transformed image components, wherein the Fourier transformed image components comprise a range of frequency components that include low frequency components at the corners of the image to high frequency components near the center of the image;
    normalizing the Fourier transformed image components by remapping the high frequency toward an edge of the image and low frequency components toward the center of the image;
    defining a set of Fourier buckets, wherein each Fourier bucket corresponds to a different range of frequencies and includes one or more Fourier transformed image components from the normalized Fourier transformed image components, the frequency associated with each of the one or more Fourier transformed image components falling within the range of frequencies corresponding to the Fourier bucket;

identifying a first Fourier bucket in the set of Fourier buckets that includes a first Fourier transformed image component that is closest to but does not exceed the threshold value;

selecting the anisotropic filter level based on the identified first Fourier bucket that includes the threshold value and a mapping between the set of Fourier buckets and the set of available anisotropic filter levels; and appending the anisotropic filter level to the image so that, when the image is read, the anisotropic filer level is read.

14. The computer system according to claim 13, wherein the Fourier transform is a fast Fourier transform.

15. The computer system according to claim 13, wherein the program includes software instructions that cause the computer system to modify the image to include a software readable control parameter that sets the anisotropic filter level.

16. The computer system according to claim 13, wherein the program includes a dynamic link library that includes instructions for obtaining the anisotropic filter level.

* * * * *